L. H. HAYS, DEC'D.
J. F. HAYS AND THE GUARDIAN SAVINGS & TRUST COMPANY, EXECUTORS.
MACHINE FOR TRIMMING COLLARS AND THE LIKE.
APPLICATION FILED JUNE 13, 1917.

1,354,906.

Patented Oct. 5, 1920.

WITNESSES=
O. W. Kappler
Thos. H. Fay

INVENTOR
Louis H Hays
BY Fay, Oberlin & Fay
ATTORNEYS

UNITED STATES PATENT OFFICE.

LOUIS H. HAYS, OF CLEVELAND, OHIO; JESSIE FEISS HAYS AND THE GUARDIAN SAVINGS & TRUST COMPANY, EXECUTORS OF SAID LOUIS H. HAYS, DECEASED, ASSIGNORS TO THE KAYNEE COMPANY, OF CLEVELAND, OHIO, A CORPORATION OF OHIO.

MACHINE FOR TRIMMING COLLARS AND THE LIKE.

1,354,906.  Specification of Letters Patent.  Patented Oct. 5, 1920.

Application filed June 13, 1917. Serial No. 174,497.

*To all whom it may concern:*

Be it known that I, LOUIS H. HAYS, a citizen of the United States, and a resident of Cleveland, county of Cuyahoga, and State of Ohio, have invented a new and useful Improvement in Machines for Trimming Collars and the Like, of which the following is a specification, the principle of the invention being herein explained and the best mode in which I have contemplated applying that principle, so as to distinguish it from other inventions.

In the manufacture of collars, cuffs and the like, such as are used on shirts, blouses and like garments, the roughly shaped pieces are first punched out by a press and are then sewed together to form the collar. After this operation, it has been necessary to trim each of these articles by hand, to the desired size, and it has been almost impossible to obtain the desired degree of accuracy. The object of the present invention is therefore the provision of a machine which will accurately and speedily trim the roughly finished collars to the desired size and shape. Another object is the provision of means whereby different sizes of collars may be trimmed on the same machine, and to this end I have provided means for changing the contour of the trimmer blade. Other objects are the provision of means for changing the contour of the blade for different types of collars as well as for different sizes. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawing:—

The machine, which is in some respects a power press, similar in general operation to my machine for cutting shirts described in application for United States patent filed January 2, 1913, Serial No. 739,675, (since issued into Patent No. 1,249,621, dated December 11, 1917,) consists of a suitable base 1, provided with an upright U-shaped standard 2, the side bars of which are beveled and have plates 9 attached thereto by bolts 10 to form guideways 3 for a reciprocably mounted plunger 4. A shaft 5 is rotatably mounted in suitable bearings in the standard 2 and the plunger is operated therefrom by cranks 7 journaled on shafts 8 and driven by revolution of the main shaft through eccentrics 6.

Figure 4:
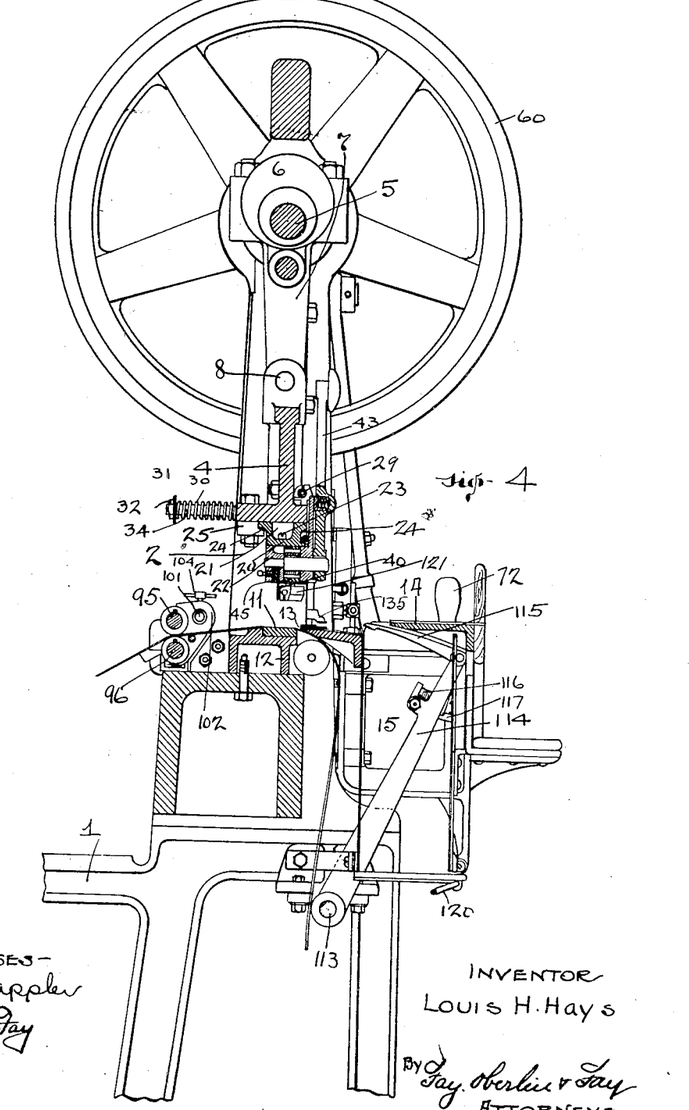
Fig. 4 is a vertical section taken on the line 4—4, Fig. 1.
Figure 5:
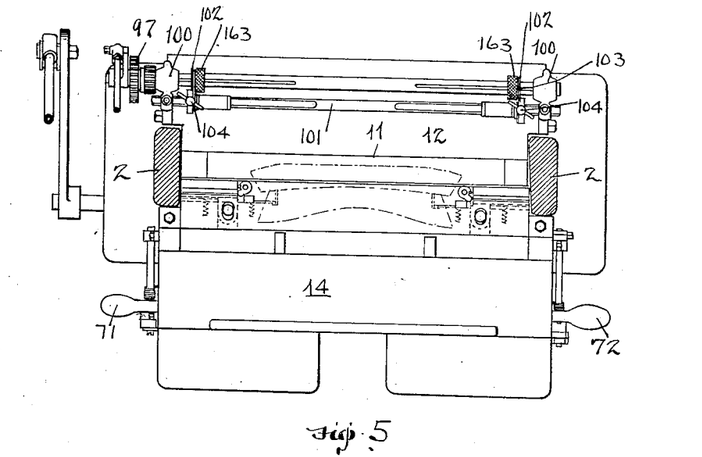
Fig. 5 is a plan view of the cutting table showing a collar in dotted outline.

As shown in Figs. 4 and 5, the base of the machine is provided with a die block 11 mounted on a sub-frame 12, and this frame is provided with a slot 13 extending transversely of the machine. A work table 14 is provided for the operator, and this is spaced slightly above and back from the frame 12. Below the table 14 and the space is a box 15 for receiving the collars after they have been trimmed.

Attached to the plunger is the knife-holder 20 which is made of two parts 21 and 22 held together by bolts 23 or the like. The upper portion has two beveled faces 24 and these are engaged by retaining lugs 25 and 26 which have complementary beveled faces. The lugs 25 are firmly fastened to the horizontal portion 27 of the plunger by bolts 28, while the front retaining lugs 26 have two beveled faces, the upper faces having a bearing on a rotatably mounted bar 29 having a complementary beveled face. These lugs have pins 34 which extend through the plunger and are threaded at their outer ends. Coiled springs 30 are mounted on these pins 34 and are adjustably held in place by washers 31 and nuts 32. These springs exert sufficient pressure on the lugs to hold them in place, thus maintaining the knife-holder and the plunger together. A handle 16 is attached to the bar 29 and by rotating this bar the rounded portion forces the lugs 26 outwardly to clear the holder. When in this position the holder may be tipped and then drawn out of contact with the lugs 25 at the rear of the plunger.

Figure 15:
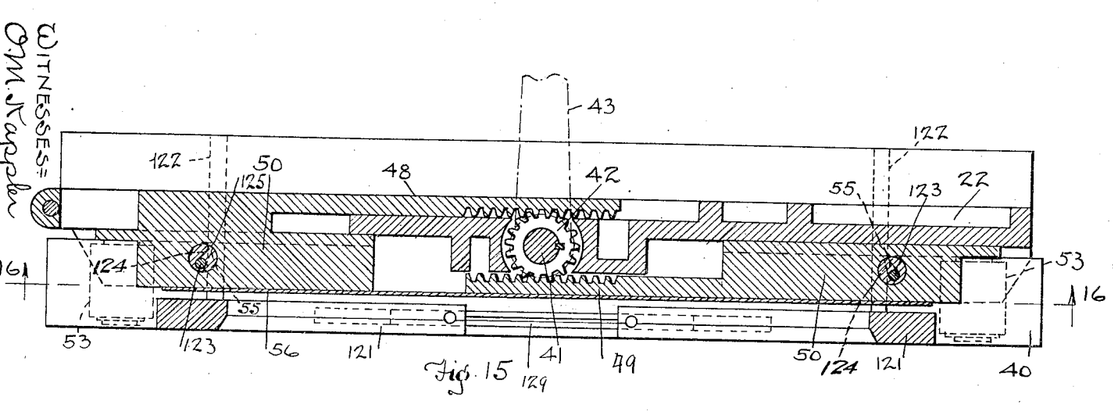
Fig. 15 is a vertical section through the holder on the line 15—15 Fig. 16.
Figure 16:
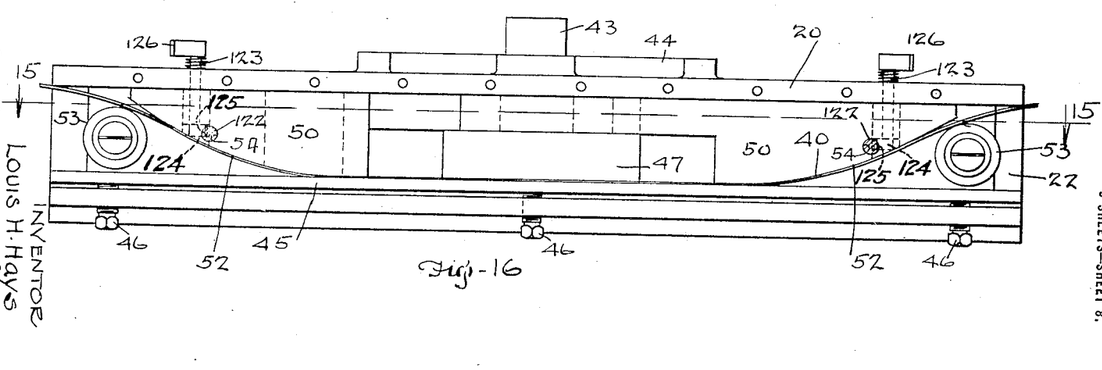
Fig. 16 is a plan view of the holder taken on the line 16—16, Fig. 15.

The trimmer blade mechanism which is shown in detail in Figs. 15 and 16, comprises the knife-holder 20, which is divided into two parts, of which the lower part 22 carries the trimmer blade or knife 40 and the mechanism for changing the contour of the blade to form it for cutting various sizes of collars. The knife-holder 22 has two downwardly extending portions in which is journaled a short shaft 41 having a gear 42 keyed thereon. This shaft is operated by a handle 43 which moves over a dial 44 which is graduated for various collar sizes, the dial being attached to the front of the holder.

The knife or trimmer blade 40 is held in the holder at its center by means of a bar 45 which is moved by screws 46 mounted in the rear of the holder to force the knife up against a block 47 within the holder. Engaging with the gear 42 are two racks 48 and 49 which are attached to the former blocks 50, and these blocks have curved faces 52, as shown, with rollers 53 adjacent the outer ends of the faces 52. The blocks slide within guideways in the holder, and a cover plate 56 is held in place over the whole.

Figure 6:
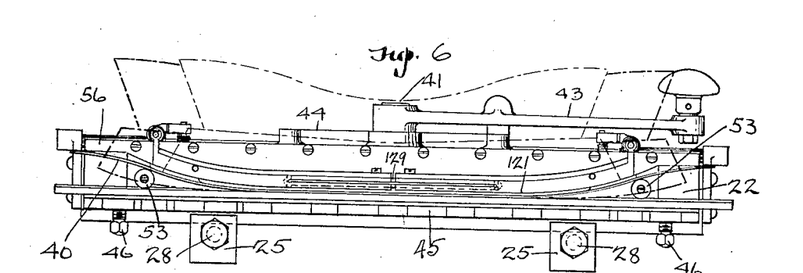
Fig. 6 is a plan of the knife-holder looking upwardly and showing collars in dotted outline.
Figure 7:
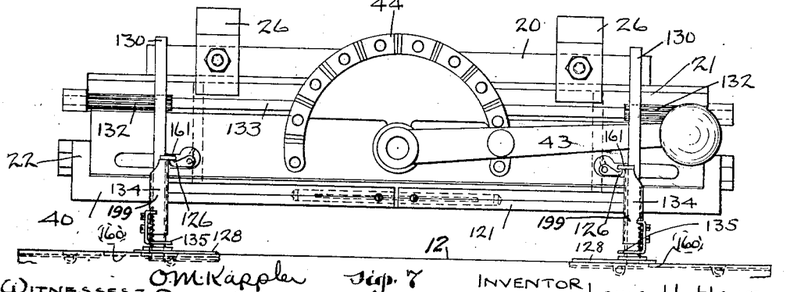
Fig. 7 is a front elevation of the knife-holder.
Figure 9:
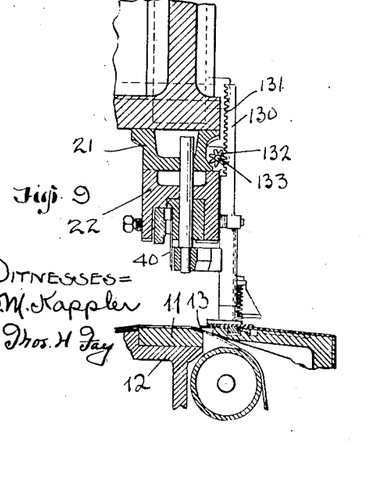
Fig. 9 is a vertical section through the knife-holder on line 9—9, Fig. 1.

The knife or blade is held fast at the center and when the blocks are forced in from the ends it is placed between the roller and the curved face of the block. As the blade is flexible, movement of the blades toward the center of the holder bends the knife nearer to the center to make it suitable for cutting smaller sized collars. As the dial is graduated for the different sizes of collars, it is only necessary to move the handle 43 to the correct graduation to vary the position of the blocks 50 thus forming the desired curve in the knife as is shown in Fig. 6 in which two sizes of collars are shown in dotted outline.

At the bottom of the holder an extensible weighted bar 121 is mounted having upwardly extending pins 122 which slide within holes 54 in the former blocks and other pins 123 are mounted through the horizontal apertures 55 in the blocks. These pins 123 are provided with dogs 124 which engage in slots 125 in the pins 122, to maintain the bar up against the bottom of the holder and at their outer ends have pawls 126. The plate 56, which covers the blocks and forms the bottom of the holder, is slotted to allow movement of the pins with the former blocks, the bar 121 being split in half and sliding over a rod 129 or the like to allow for the expansion of the bar.

The bar 121 is adapted to be dropped down after a garment has been positioned over the die block, to hold the same in place during the operation of the plunger. Guides 128 are slidably mounted in slots 160 in the frame 12 and these guides are formed at the bottom to fit the sides of a collar so that the operator may correctly position it over the die block. These guides are provided with upwardly extending tubes in which are slidably mounted upwardly extending rods 130 which are attached to the bar 121, and are provided with gear teeth 131 along their rear faces, which mesh with wide faced gears 132 formed on a rotatably mounted shaft 133 carried on the front of the holder. About the tubes of the guides 128 other small tubes 134 are slidably mounted, and these tubes extend upwardly and are provided with a latch 161 adapted to engage the pawls 126 to release the weighted bar. At the lower end the tubes have a radial flange 135 by which they may be moved to engage the pawls to release and lower the bar onto the collar. When the plunger has moved down into its cutting position the dogs 124 will again engage with the pins on the weighted bar and raise the same with the plunger.

Figures 2, 17:
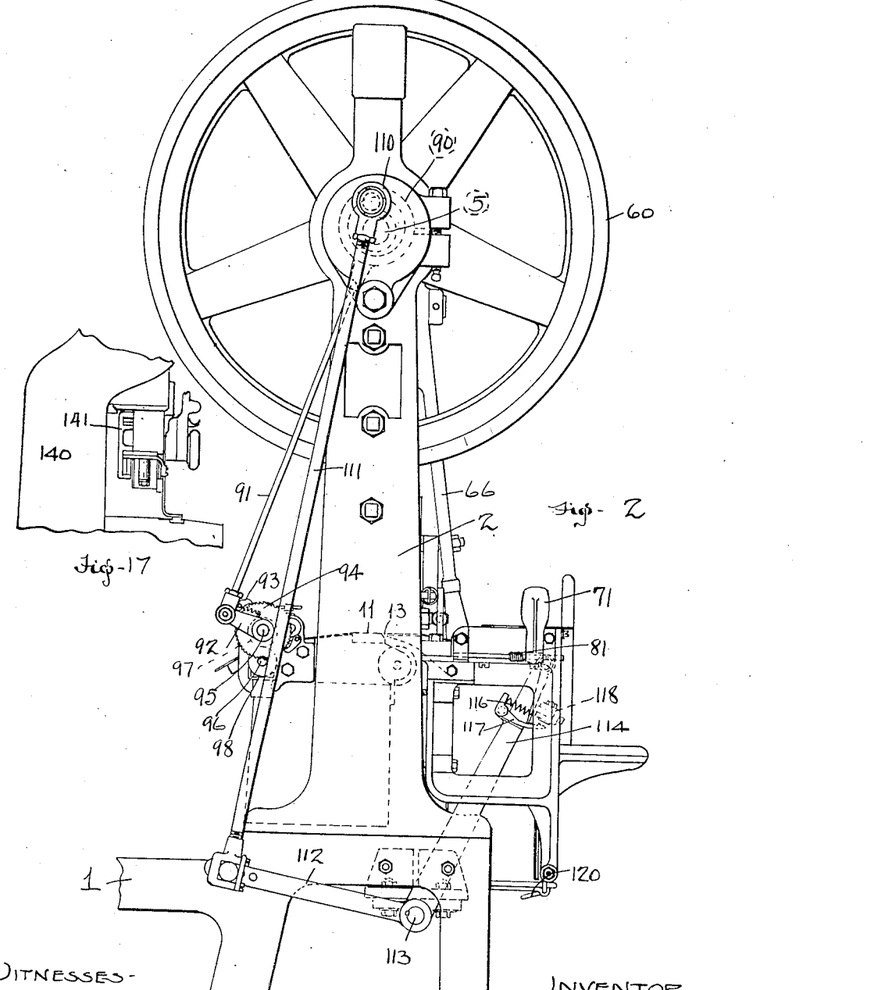
Fig. 2 is a side elevation looking from the left in Fig. 1.
Fig. 17 is a broken side elevation of a modified form of my machine.
Figure 3:
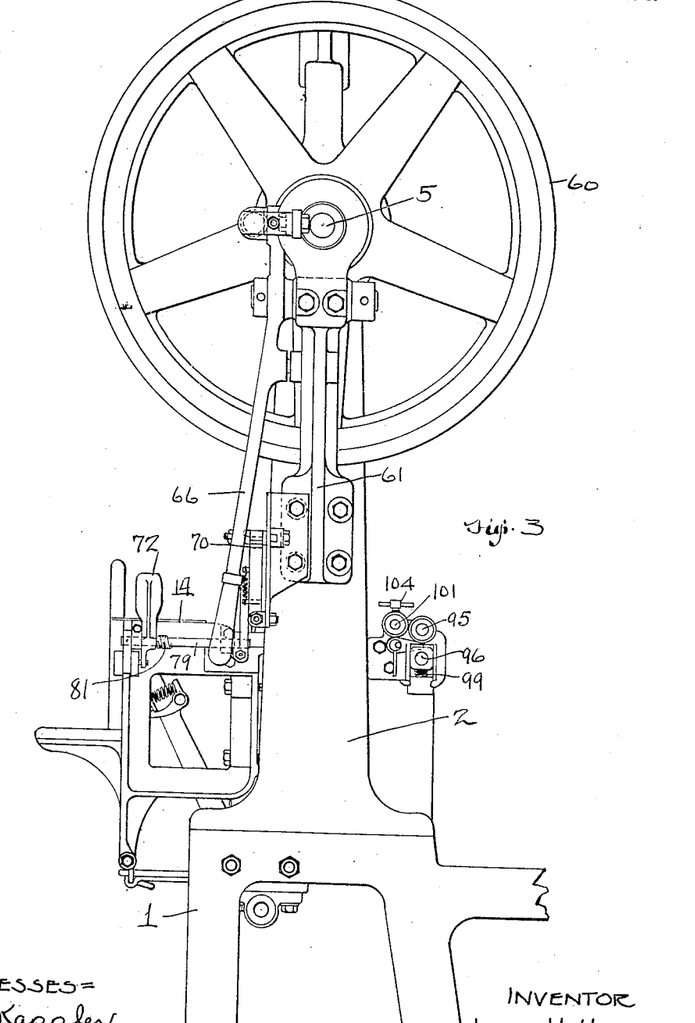
Fig. 3 is a side elevation looking from the right in Fig. 1.
Figures 18, 20:
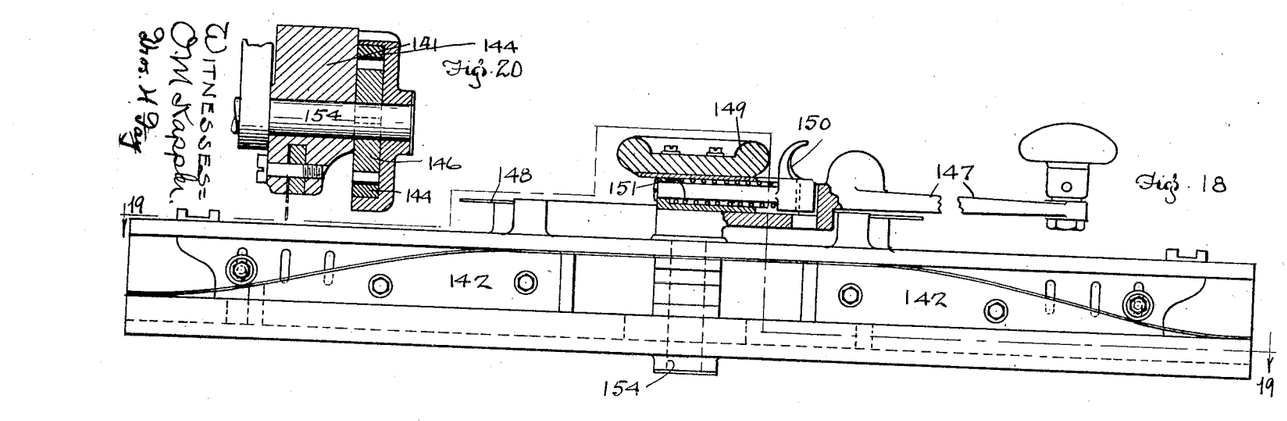
Fig. 18 is a bottom plan view of a modified form of trimmer blade holder with parts in section.
Fig. 20 is a section on the line 20—20, Fig. 19.
Figure 19:
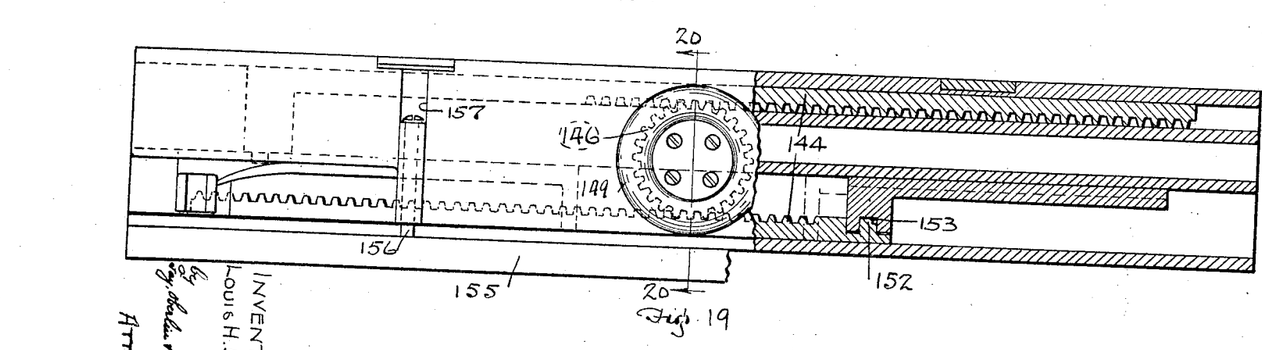
Fig. 19 is a section on the line 19—19, Fig. 18, with parts in elevation.

In Figs. 17, 18 and 19, a modified form of trimmer is shown in which a curved standard 140 is used, the guideways for the plungers being shortened, and in which a knife-holder 141 of slightly different design is used. The holder is fastened to the plunger in the same manner as before but is sufficiently in front of the upright standard 140 to allow the former blocks 142 to be removed without detaching the holder from the plunger.

In this holder 141 two former blocks 142 are slidably mounted and are removably attached to the racks 144 in mesh with the gear wheel 146. The racks have lugs 152 which engage in slots 153 in the blocks to move them. The handle 147 moves over a graduated dial 148 but a hand wheel 149 is mounted on the shaft 154 which carries the gear and has a latch 150 which engages with the handle proper, and is held in place by a spring 151. Thus when the blocks have been moved outwardly to their extreme limit, the latch is released and then by turning the hand wheel the blocks are forced out of the ends of the holder so that new blocks may be inserted therein. A straight bar 155 is movably attached to the holder by means of headed pins 156 sliding in apertures 157 in the holder and this bar is capable of limited movement away from the holder and will contact with the collar or the like to hold the same in place during the trimming operation.

In this figure a different contour is given to the knife and it will of course be understood that the knife will be held in any desired position in the holder and the blocks 142 will be of such shape as to bend the knife to the contour desired.

Figures 11, 14:
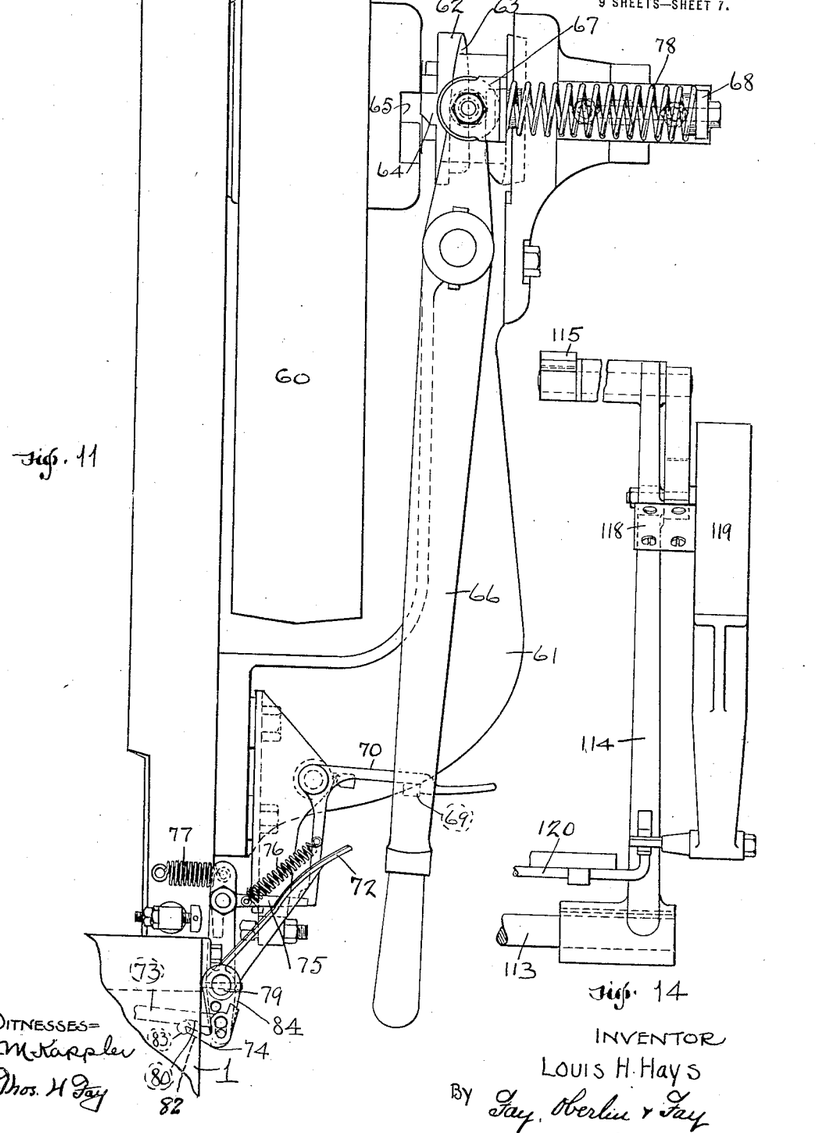
Fig. 11 is a front elevation of the clutch operating mechanism.
Fig. 14 is a view of another detail.
Figure 12:
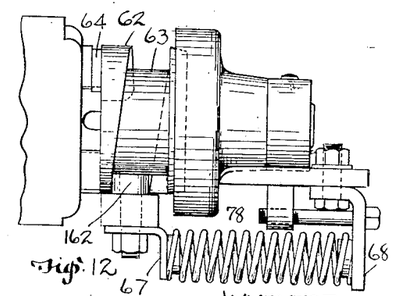
Fig. 12 is a plan view of a clutch detail.

The shaft 5 extends through the standards and at one end is provided with a pulley wheel 60 which is loosely mounted. Upon a bowed arm 61 is mounted a clutch mechanism. The shaft 5 extends into and has a bearing in the upper end of the bowed arm, and upon this shaft is slidably mounted a collar 62 which is keyed to the shaft. This collar has a circumferential groove 63 with cam surfaces on the sides and is provided with dogs 64 on the face toward the pulley, adapted to engage in apertures 65 in the pulley wheel hub. A clutch lever 66 is pivotally mounted on the bowed arm and is provided with a pin 162 which engages in the groove 63. A bracket 67 is mounted on the lever and an alined bracket 68 is attached to the bowed arm, and a coiled spring 78 is mounted between these brackets and is adapted to normally throw said collar into engagement with the pulley wheel.

Figures 1, 8, 13:
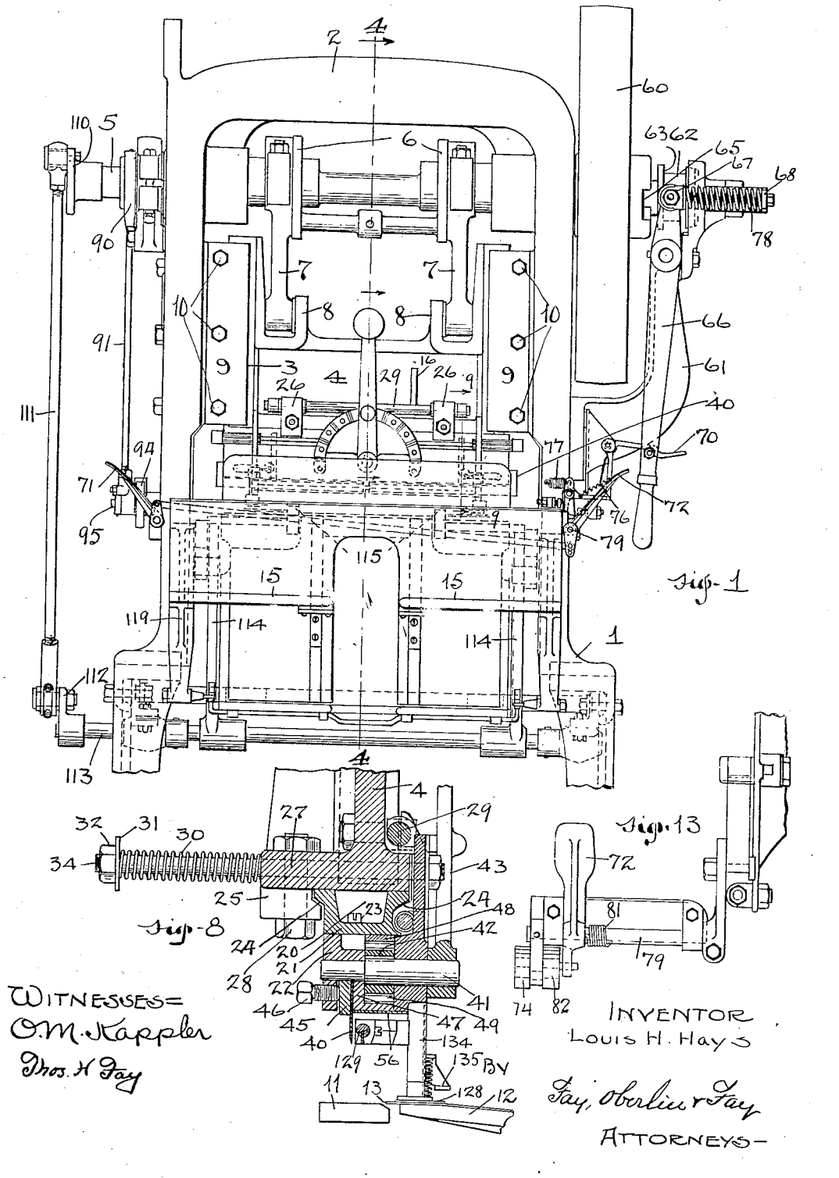
Figure 1 is a front elevation of the machine.
Fig. 8 is a section on the same plane as Fig. 4, but showing an enlarged view of the knife-holder.
Fig. 13 is a side elevation of the release mechanism.

At the lower end the lever is provided with a lug 69 which is engaged by a bellcrank lever 70 pivotally mounted on the arm 61, to maintain the clutch in its inoperative position. If the clutch is engaged a single revolution of the shaft causes the cam face on the collar to force the lever to its inoperative position where it is engaged by the lever 70. At the sides of the operating table are two handles 71 and 72. Handle 71 is connected by a rod 73 to a small pawl 74 which is pivotally mounted on a lever 84 carried by a shaft 79. The handle 72 operates a second pawl 82 similar to pawl 74 carried on the other side of lever 84. Both pawls normally engage in a latch piece 83, thus locking the handles against accidental movement. By depressing handle 71 the pawl 74 is released and by depressing the handle 72 the pawl 82 is released, so that further movement of the handle 72 will operate the rock shaft 79, but this can only be done when both pawls have been released. The shaft has a bell crank 75 at its other end which engages with one arm of the lever 70. Movement of the two handles operates the shaft 79 and the crank 75, to release the clutch lever 66. Small springs 76 and 77 are used to hold the levers 70 and 75 in their normal positions. Other springs 81 are employed to return the handles to the normal position after operating. By these means it will be seen that the operator is forced to use both hands to operate the machine and there is no possibility of the operator having a hand under the plunger when it comes down.

Figure 10:
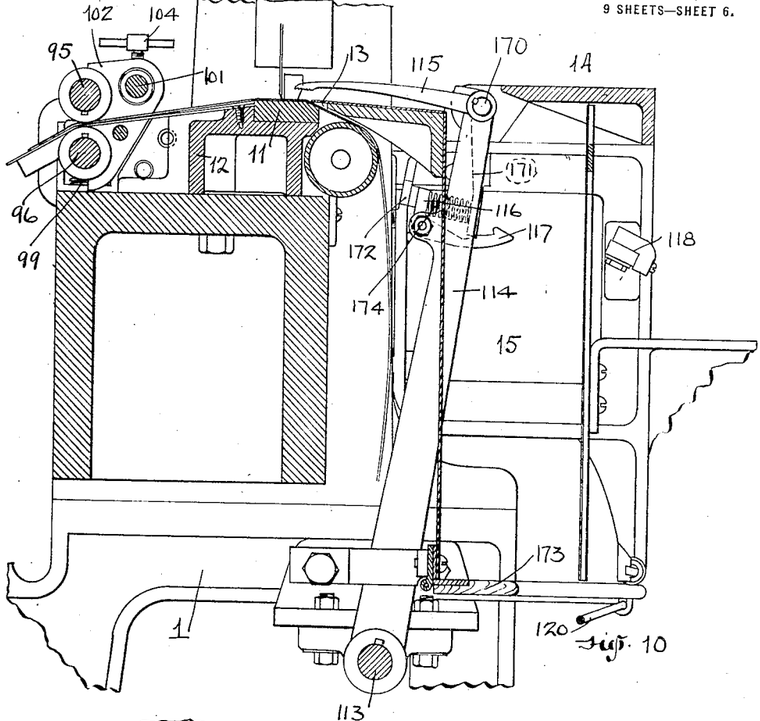
Fig. 10 is a sectional view showing the paper feed mechanism.

The mechanism for feeding the paper backing strip consists of an eccentric 90 mounted on the extension of the shaft 5 and connected by a rod 91 to a pivotally mounted lever 92. A pawl 93 is carried by the lever and this engages with a gear 94 mounted on a shaft 95 extending transversely of the machine. A second shaft 96 is mounted below the first shaft 95 upon springs 99. These two shafts are mounted in bearings 100 and carry alined gears 97 and 98 which are in mesh. Knurled rollers 163 are slidably keyed to shafts 95 and 96, and these rollers 163 are adapted to grip the paper sheet 164 close to its outer edges. The springs 99 keep the lower shaft up tight enough to cause rotation of the rollers to move the paper strip. A bar 101 is mounted in front of the two shafts and is provided with guide members 102 which fit in alined grooves 103 in the rollers. These members 102 are clamped to the bar by clamps 104, and may be moved along the same to position the rollers on the shafts, to handle different widths of paper. The eccentric is so arranged that the pawl will operate the shafts during the upward stroke of the plunger to move the paper backing strip along and present a fresh surface for each succeeding stroke of the knife, the paper strip merely acting as a backing for the cutting blade to allow the complete severance of the material of the collars.

On the shaft 5 is mounted a second eccentric 110 which operates a rod 111 and a link 112 which is in turn connected to a cross shaft 113 mounted in the base of the machine. On this shaft 113 are mounted two upwardly extending arms 114 which are provided at their upper ends with forwardly extending fingers 115 having roughened ends, which are attached to short shafts 170 carried in the arms 114. To the fingers 115 are attached downwardly extending levers 171. Latches 117 are mounted on the arms 114 and are provided with lugs 116. Between these lugs and the levers 171 springs 174 are mounted. During forward movement of the fingers they are maintained away from the collar by the latches 117 which engage with the levers 171. When the fingers reach their forward position the lug 116 strikes stops 172 carried on the frame which trips the latches and releases the fingers so that they engage the collar, carrying it off the table during their return movement, and carries them into the box below the operating table. When the arms 114 near the end of their return movement, the levers 171 strike the stops 118 and the latches again engage to maintain the fingers in their non-engaging position.

The box or holder 15 is closed at the bottom by means of a trap door 173 which is normally held up by a spring latch 120. By unlatching this the door may be dropped and the collars readily removed therefrom.

The operation of the device is thought to be clear. With the plunger in its upward position as shown in Fig. 4, the operator will first set the handle 43 to the correct point on the dial for the size collars or the like that are to be trimmed. After this is done a collar will be positioned over the block against the guides and the operator will lower the weighted bar onto the collar, by pressing on the radial flanges 135. The collars are made of cloth and are finished before being trimmed except for their lower edge or that part of the collar which encircles and is buttoned to the neck band of a shirt. The straight sides of the collar and the upper curved edge, as shown in Fig. 6, are finished before the trimming operation. In actual manufacture the collar is sewed together along three sides and is then turned so as to leave the edges of the material which make up the edge of the collar which fits the neck band unsewed, and it is the trimming of this edge which is accomplished in the present machine. To operate the plunger and the trimmer blade, the operator must then remove his hands and press outwardly upon the two handles 71 and 72 to engage the clutch. When this has been done the plunger moves down and the knife cuts the collar to the desired shape and goes into the paper over the die block.

As soon as the plunger starts the upward movement the paper feed mechanism moves the knurled rollers to advance the paper strip in order to provide a fresh piece over the block for the next cut. At the same time the arms 114 and fingers 115 move forward and engage with the collar and on their return movement carry it off the block and into the box below the work table. When the plunger reaches its upward position it is released and remains up ready for the operation to be repeated.

It will be clear that the operator can change the contour of the knife blade to cut or trim collars of different sizes and it is only necessary to turn the handle to the desired graduation on the dial. As the operator does not have to remove the collar after it has been trimmed, he need only pick up another collar as soon as he has operated the clutch through the handles at the side of the machine. The operator is then ready to position the new collar as soon as the first one has been removed.

In the modified form where the machine is designed for trimming various types of collars, cuffs and the like, the former blocks may be readily removed and others inserted to give the desired contour to the trimmer blade and as has been explained, the blocks come out of the holder in front of the curved standards of the machine. The operation of the machine is speedy and trims each piece exactly alike. The operator is in no danger and his hands must be at the sides of the table, well away from the knife blade when it descends.

The speed and ease of operation, and the absolute accuracy obtained, make the machine far superior to the old methods of trimming by hand.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a machine of the character described, the combination of a block, a plunger reciprocable toward and from said block, a holder removably attached to said plunger, an adjustable trimmer blade mounted in said holder, two like former blocks movably mounted in said holder and adapted to change the contour of said blade, a handle movably mounted on said holder, and gear means connecting said handle and said blocks to move the latter to change the contour of said blade.

2. In a machine of the character described, the combination of a block, a plunger reciprocable toward and from said block, a holder removably attached to said plunger, an adjustable trimmer blade mounted in said holder, two like former blocks movably mounted in said holder and adapted to change the contour of said blade, a graduated dial on said holder, and a handle movably mounted on said holder over said dial, and gear and rack means connecting said handle and said blocks to move the latter to change the contour of said blade.

3. In a machine of the character described, the combination of a block, a plunger reciprocable toward and from said block, a holder removably attached to said plunger, an adjustable trimmer blade mounted in said holder, a gear mounted in said holder, two former blocks movably mounted in said holder and having extending racks engaging said gear, and a handle adapted to rotate said gear to variously position said blocks against said blade and vary the contour of said blade.

4. In a machine of the character described, combination of a block, a plunger reciprocable toward and from said block, a holder carried by said plunger, a trimmer blade mounted in said holder, and means connected to said holder and capable of independent downward movement to maintain a garment to be trimmed over said block during downward movement of said holder.

5. In a machine of the character described, the combination of a block, a plunger reciprocable toward and from said block, a holder carried by said plunger, a trimmer blade mounted in said holder, and means movably mounted in said holder and capable of independent downward movement to maintain a garment to be trimmed over said block during downward movement of said holder, said means being operatively connected with said holder to move with the same during upward movement of said holder.

6. In a machine of the character described, the combination of a block, a plunger reciprocable toward and from said block, a holder carried by said plunger, a trimmer blade mounted in said holder, a weighted bar movably connected to said holder and adapted to be lowered onto a garment to be trimmed to maintain the same in position over said block during downward movement of said plunger.

7. A trimmer blade comprising a holder, a relatively flexible cutting blade removably held at its center in said holder, and movable blocks each consisting of a curved block portion and a roller adjacent thereto adapted to engage said blade therebetween to change the contour of the same.

8. A trimmer blade comprising a holder, a relatively flexible cutting blade removably held at its center in said holder, movable blocks each consisting of a curved block portion and a roller adjacent thereto adapted to engage said blade therebetween to change the contour of the same, and a handle operatively connected to said blocks to move the same along said blade.

9. In a machine of the character described, the combination of a frame, a die block, a plunger reciprocable toward and from said frame, a holder attached to said plunger, a trimmer blade adjustably mounted in said holder, and means movably mounted in said holder and said frame and adapted to determine the position of a garment over said block.

10. In a machine of the character described, the combination of a frame, a die block, a plunger reciprocable toward and from said block, a holder attached to said plunger, a trimmer blade adjustably mounted in said holder, guides movably mounted in said holder and movably attached to said frame for determining the position of a collar over said block, and means for moving said guides for different sizes of collars.

11. In a machine of the character described, the combination of a slotted frame, a die block mounted in said frame, a plunger reciprocable toward and from said table, a holder attached to said plunger, a flexible trimmer blade mounted in said holder, movable blocks mounted in said holder and adapted to bend said blade into desired contour, positioning guides slidably mounted in such slots in said frame and adapted to determine the position of the collar to be trimmed over said block, said guides being movable with said blocks to change their position for various sizes of collars.

12. In a machine of the character described, the combination of a slotted frame, a die block mounted in said frame, a plunger reciprocable toward and from said table, a holder attached to said plunger, a flexible trimmer blade mounted in said holder, movable blocks mounted in said holder and adapted to bend said blade into desired contour, positioning guides slidably mounted in such slots in said frame and adapted to determine the position of the collar to be trimmed over said block, pins on said guides connected to said blocks, and means for moving said blocks and said guides to change the contour of said blade and to position said guides for various sizes of collars.

13. In a machine of the character described, the combination of a block; a plunger reciprocable toward and from said block; a trimmer blade holder carried by said plunger; a flexible blade adjustably mounted in said holder; means mounted in said holder for changing the contour of said blade; and a weighted bar carried by said holder and adapted to be independently lowered onto a garment positioned over said block.

14. In a machine of the character described, the combination of a block; a plunger reciprocable toward and from said block; a trimmer blade holder carried by said plunger; a flexible blade adjustably mounted in said holder; means mounted in said holder for changing the contour of said blade; a weighted bar carried by said holder and adapted to be lowered onto a garment positioned over said block; and means for lowering said bar independently of movement of said plunger.

15. In a machine of the character described, the combination of a block; a plunger reciprocable toward and from said block; a trimmer blade holder carried by said plunger; a flexible blade adjustably mounted in said holder; means mounted in said holder for changing the contour of said blade; a weighted bar carried by said holder and adapted to be lowered onto a garment positioned over said block; means for lowering said bar independently of movement of said plunger; and mechanism in said holder adapted to engage with said bar and raise the same during upward movement of said plunger.

16. In a machine of the character described, the combination of a block; a plunger reciprocable toward and from said block; a trimmer blade holder carried by said plunger; a flexible blade adjustably mounted in said holder; means mounted in said holder for changing the contour of said blade; an extensible weighted bar movably attached to said holder, collar positioning guides attached to said bar, means for normally securing said bar to said holder, means for releasing said bar to lower the same to hold the collar in position during downward movement of said plunger.

17. In a machine of the character described, the combination of a die block; a plunger reciprocable toward and from said block; a knife holder carried by said plunger; a flexible trimmer blade mounted in said holder; means for adjusting the contour of said blade; adjustable means for determining the position of the collar over said die block; a movable bar connected to said holder and capable of independent downward movement onto the collar to hold the same in position during downward movement of said plunger; and means for removing said collar during upward movement of said plunger.

18. In a machine of the character described, the combination of a die block; a plunger reciprocable toward and from said block; a knife holder carried by said plunger; a flexible trimmer blade mounted in said holder; means for changing the contour of said blade; movable guides adapted to determine the position of the collar over said die block; a movable bar connected to said holder and capable of independent downward movement onto the collar to maintain the same in position during downward movement of said plunger, mechanism carried by said holder and adapted to raise said bar during upward movement of said plunger; and movable fingers adapted to engage with and remove the collar from said die block during upward movement of said plunger.

19. In a machine of the character described, the combination of a frame, a die block, a plunger reciprocable toward and from said block, a holder attached to said plunger, a trimmer blade adjustably mounted in said holder, guides movably mounted on said holder and movably attached to said frame for determining the position of a collar over said block; and means for simultaneously changing the contour of said blade and positioning said guides for various sizes of collars.

20. In a machine of the character described, the combination of a slotted frame, a die block, a plunger reciprocable toward and from said block, a holder attached to said plunger, a trimmer blade adjustably mounted in said holder, guides movably mounted on said holder and movably mounted in such slots in said frame for determining the position of a collar over said block and means for simultaneously changing the contour of said blade and positioning said guides for various sizes of collars.

Signed by me, this 11th day of June, 1917.

LOUIS H. HAYS.

Attested by—
THOMAS H. FAY,
MARY GLADWELL.